United States Patent
Phillips

(10) Patent No.: US 9,064,162 B2
(45) Date of Patent: *Jun. 23, 2015

(54) TWO-PART READER FOR CONTACTLESS CARDS

(71) Applicant: MasterCard International Incorporated, Purchase, NY (US)

(72) Inventor: Simon Phillips, York (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,676

(22) Filed: Mar. 21, 2014

(65) Prior Publication Data

US 2014/0203083 A1 Jul. 24, 2014

Related U.S. Application Data

(63) Continuation of application No. 13/337,921, filed on Dec. 27, 2011, now Pat. No. 8,701,992.

(60) Provisional application No. 61/427,875, filed on Dec. 29, 2010.

(51) Int. Cl.
*G06K 7/00* (2006.01)
*G06K 7/01* (2006.01)
*G06K 7/015* (2006.01)
*G06K 7/10* (2006.01)

(52) U.S. Cl.
CPC ............. *G06K 7/01* (2013.01); *Y10T 29/49826* (2015.01); *G06K 7/0008* (2013.01); *G06K 7/015* (2013.01); *G06K 7/10* (2013.01)

(58) Field of Classification Search
USPC .................. 235/439, 383, 380, 385
See application file for complete search history.

(56) References Cited

U.S. PATENT DOCUMENTS

| | | | |
|---|---|---|---|
| 6,296,182 B1 * | 10/2001 | Ota et al. | 235/379 |
| 7,832,646 B1 * | 11/2010 | Leason | 235/492 |
| 8,240,560 B2 * | 8/2012 | Adams et al. | 235/380 |
| 8,341,083 B1 * | 12/2012 | Jain | 705/41 |
| 8,613,392 B2 * | 12/2013 | Phillips | 235/439 |
| 8,701,992 B2 * | 4/2014 | Phillips | 235/439 |
| 2007/0152035 A1 * | 7/2007 | Adams et al. | 235/380 |
| 2010/0252622 A1 * | 10/2010 | Bedore | 235/380 |
| 2012/0168504 A1 | 7/2012 | Phillips | |
| 2012/0265685 A1 * | 10/2012 | Brudnicki et al. | 705/44 |

* cited by examiner

*Primary Examiner* — Daniel St Cyr
(74) *Attorney, Agent, or Firm* — Buckley, Maschoff & Talwalker LLC

(57) ABSTRACT

Pursuant to some embodiments, systems, methods, apparatus and means for operating two-part contactless card readers are provided. In some embodiments, the two-part contactless card reader is installed in association with a transaction counter, where the transaction counter has a first surface and a second surface. Pursuant to some embodiments, the device includes a customer-facing unit installed on a first surface of the transaction counter, a base unit installed on a second surface of the transaction counter, the second surface apart from the first surface, where the first surface and the second surface are separated by a substantially solid material with no aperture formed therethrough. The base unit includes electronic components for generating interrogation signals for interrogating contactless cards, the electronic components also for receiving card data signals from the contactless cards, the card data signals indicative of card data stored in the contactless cards. The customer-facing unit includes at least one indicia for indicating, to a user of a contactless card, a location at which the contactless card is to be presented to the contactless card reader.

20 Claims, 3 Drawing Sheets

TWO-PART READER FOR CONTACTLESS CARDS

CROSS REFERENCE TO RELATED APPLICATIONS

This application is based on, and claims benefit to and priority of, U.S. patent application Ser. No. 13/337,921, filed Dec. 27, 2011, and U.S. Provisional Patent Application Ser. No. 61/427,875, and the contents of both applications are hereby incorporated herein in their entirety for all purposes.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna.

MasterCard International Incorporated, the assignee hereof, has established a widely-used standard, known as "PayPass", for interoperability of contactless payment cards and proximity readers. It has also been proposed to use wireless exchanges of information via NFC (Near Field Communication) for payment applications.

In order for the contactless payment cards to be read at the point of sale, suitable contactless reader devices (referred to above as "proximity readers") are provided as peripheral devices for the electronic cash registers (ECRs) or other types of terminals that serve as point of sale (POS) or point of transaction terminals.

In some cases the environment in which the POS terminal is located may not be conducive or convenient for installation or use of a contactless reader. For example, for some events that are held out of doors, the point of sale may be exposed to the elements. As a result, in inclement weather the operation of the contactless reader may be compromised. In other situations, it may be inconvenient or costly to drill through the checkout counter in order to install the contactless reader and/or its connecting cable to the POS terminal.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

Pursuant to some embodiments, systems, methods, apparatus and means for operating two-part contactless card readers are provided. In some embodiments, the two-part contactless card reader is installed in association with a transaction counter, where the transaction counter has a first surface and a second surface. Pursuant to some embodiments, the device includes a customer-facing unit installed on a first surface of the transaction counter, a base unit installed on a second surface of the transaction counter, the second surface apart from the first surface, where the first surface and the second surface are separated by a substantially solid material with no aperture formed therethrough. The base unit includes electronic components for generating interrogation signals for interrogating contactless cards, the electronic components also for receiving card data signals from the contactless cards, the card data signals indicative of card data stored in the contactless cards. The customer-facing unit includes at least one indicia for indicating, to a user of a contactless card, a location at which the contactless card is to be presented to the contactless card reader.

The result is a contactless card reader that can be installed in used in a variety of environments where other card readers could not, including, for example, in exterior locations subject to weather, in interior locations that could be subject to water or other damage (such as the counter top of a bar or restaurant table) or the like.

As used herein, the term "contactless card" refers to proximity devices which may interact with proximity device readers. For example, a contactless card may be a PayPass® contactless payment device, and the proximity device reader may be a reader capable of interacting with a PayPass® device. A number of different contactless devices may be supported using features of the present invention, including proximity payment devices, access devices, or the like. While the term "contactless card" is used herein, the term is not intended to be limited to the use of an actual card-shaped proximity device—instead, the contactless card may be shaped in any of a number of different forms, or may be embodied in other devices (such as, for example, a mobile telephone, a drinking vessel, or the like).

Figure 1:
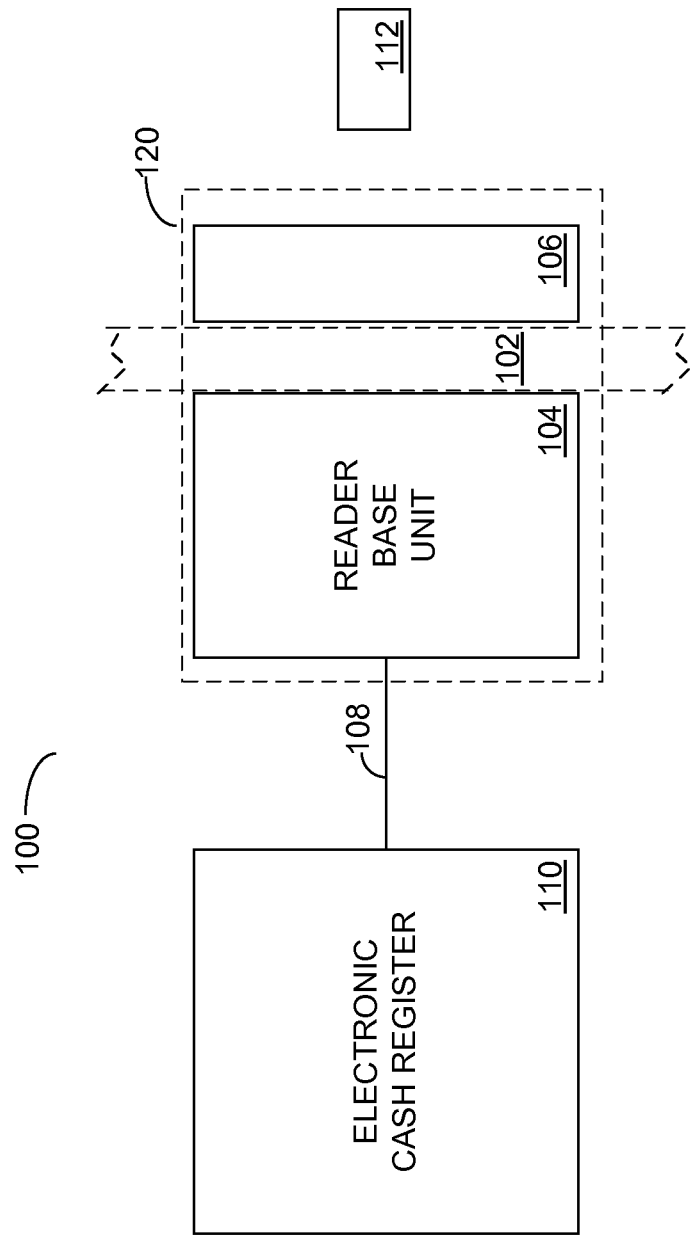
FIG. 1 schematically illustrates an installation of a two-part contactless card reader provided in accordance with aspects of the present invention.

FIG. 1 schematically illustrates an installation 100 of a two-part contactless card reader 120 provided in accordance with aspects of the present invention. Two-part contactless card reader 120 may include a base unit 104 positioned on one side of a counter 102, and a customer-facing unit 106 positioned on another side of the counter 102. Pursuant to some embodiments, an installation may include one or more two-part contactless card readers positioned in locations where users will interact with the reader. For example, in some embodiments, the readers may be positioned along a vertical surface, such as a wall, or a horizontal surface, such as a countertop (e.g., at a checkout counter, on a bar, on a table at a restaurant, or the like). The term "counter" or "transaction counter" is used herein to refer to any surface or object that has two sides on which the two parts of the contactless card reader 120 may be positioned. In some embodiments, a "counter" may be a solid piece of material having two opposing sides, one side of which supports the customer-facing unit 106, the other side of which supports the base unit 104. Pursuant to some embodiments, no hole, aperture, or other via is required to place the customer-facing unit 106 in communication with the base unit 104.

The dashed line object shown in FIG. 1 is indicated by reference numeral 102 and schematically represents a portion of the counter (or other object) at which the contactless card reader 120 is installed.

The two parts of the contactless card reader 100 include a base unit 104 and a customer-facing unit 106. Pursuant to some embodiments, there is no wire or cable connection between the customer-facing unit 106 and the base unit 104. Accordingly, there need not be any aperture drilled or formed or otherwise present in the counter 102 at the locus of the customer-facing unit 106 and the base unit 104. This is the case notwithstanding that the customer-facing unit 106 is installed on one side of the counter 102 and the base unit 104 is installed on the other side of the counter 102, with the counter 102 physically separating and isolating the two parts (104, 106) of the contactless card reader 120 from each other. In some embodiments, the configuration of the counter may be such that it protects the base unit 104 from the elements, whereas the customer-facing unit 106 may be exposed to the elements. For example, in an illustrative environment where the invention is used to process contactless payment card transactions at a bar, the customer-facing unit 106 may be positioned on top of a bar (allowing patrons to tap their contactless payment devices on the top portion of customer-facing unit 106), and the base unit 104 may be positioned underneath the bar, thereby protecting the base unit 104 from beverage spills, cleaning, and the like.

In some embodiments, the base unit 104 is connected, via a cable 108, with a conventional electronic cash register ("ECR") 110 to permit exchanges of data communications between the base unit 104 and the ECR 110. In use, a contactless card 112 (such as a contactless payment card) is presented to the customer-facing unit 106 causing the contactless card 112 and the card reader 120 to interact. Card data from the contactless card 112 is read and transmitted from the card reader 120 to the ECR 110 to conduct a transaction (such as a purchase transaction). Details of contactless interactions with respect to some contactless payment cards are described in, for example, the PayPass® standards promulgated by MasterCard International Incorporated as well as in various international standards such as ISO/IEC 14443, the contents of each of which are hereby incorporated in their entirety for all purposes.

Figure 2:
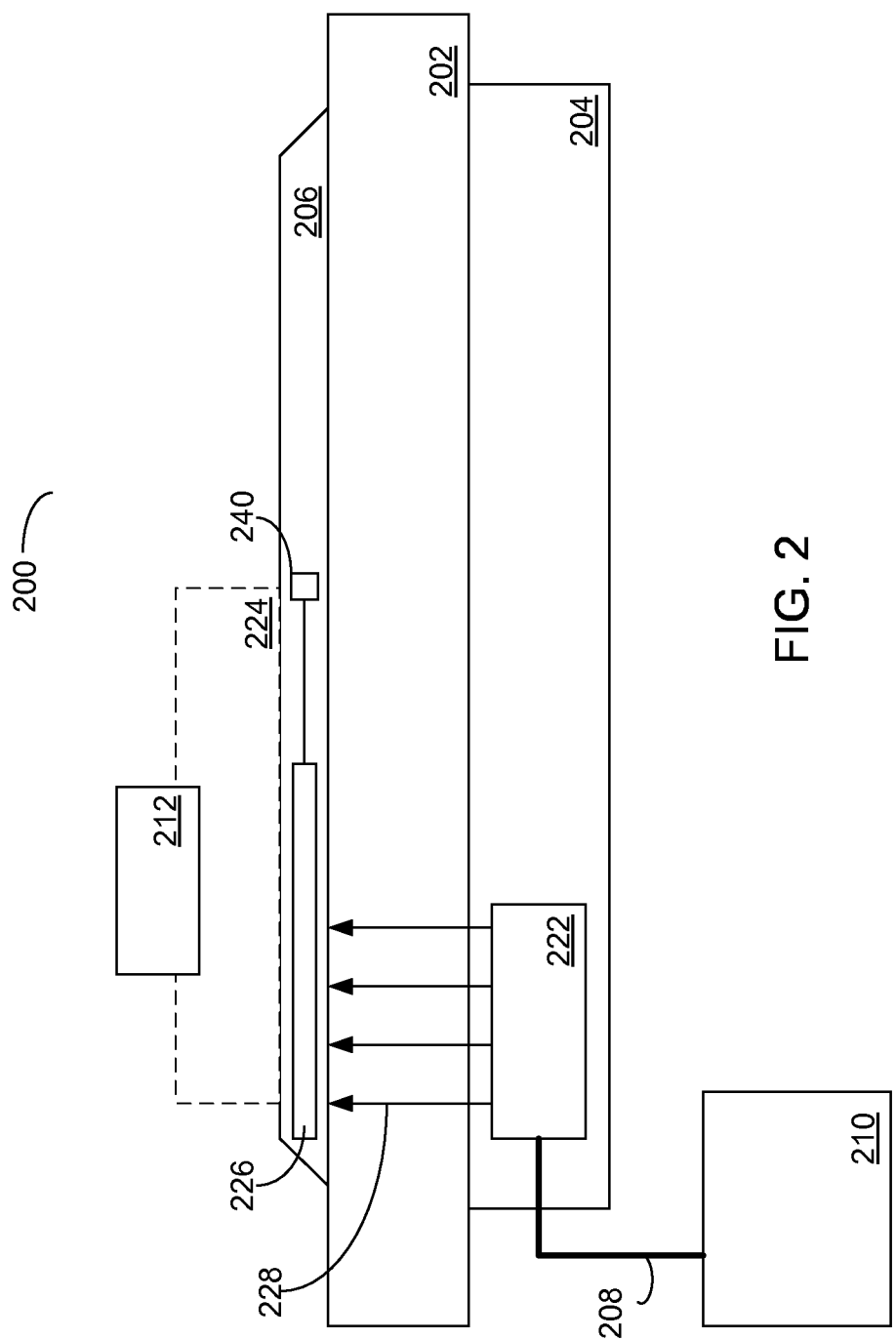
FIG. 2 is an alternative schematic representation of the installation of the contactless card reader shown in FIG. 1.

Reference is now made to FIG. 2, where a side view of portions of the two-part contactless reader installed on a counter is shown. As shown, to enable the customer-facing unit 226 to be advantageously installed in exposed locations, it may be entirely sealed and encapsulated within a waterproof housing 206, e.g., formed of rubber, vinyl, and/or coated with a plastic film. Preferably no wires or cables emerge from the housing 206. With such a housing, it may be feasible to locate the customer-facing unit 226 in positions that are open to the elements, or subject to being splashed with liquids, such as at a bar, movie theater concession stand, ice cream store counter, swimming pool, etc. Power for the customer-facing unit 226 may be supplied from a long-life battery (not separately shown) within the housing and/or may be provided via inductive coupling between the customer-facing unit 226 and the base unit 204. As another alternative, at least some power for the customer-facing unit 226 may be supplied from a solar cell (not shown) that may be included on the outer surface of the housing 206 of the customer-facing unit 226.

It may be desirable for the customer-facing unit 226 (and, in some embodiments, the housing 206) to have a low profile, i.e., a very narrow width of say 2 to 5 mm. This may facilitate mounting the customer-facing unit 226 in locations where space is at a premium, and may also allow for significant flexibility in positioning the customer-facing unit 226 in locations such as on a checkout counter. It is also an advantage that the customer-facing unit 226 (and/or the housing 206) may cause little or no alteration in the profile of the checkout counter itself, thereby possibly enhancing the aesthetic appeal of the point of sale location. In some embodiments, the housing 206 of the customer-facing unit 226 may be attached to the checkout counter wall 102 by adhesive or the like.

The base unit 204 may include electronic circuitry that is configured to exchange communications with the contactless card 212. For example, the electronic circuitry in the base unit 204 may be configured to operate in accordance with the PayPass standard, allowing interaction between a contactless payment card 212 and an electronic cash register 210 to conduct contactless payment transactions. The electronic circuitry in the base unit 204 may be substantially conventional except that, in some embodiments, it may include structure for inductive coupling to the customer-facing unit 226 and/or for wirelessly transmitting power to the customer-facing unit 226. In addition, in some embodiments, the electronic components in the base unit 204 may include one or more devices for implementing a radio or optical communications link to the customer-facing unit 226.

In some embodiments, the base unit 204 includes an antenna that is coupled to the communications/processing components of the base unit 204. In these cases, the antenna transmits interrogation signals to the contactless payment card 212 through the counter 202 and through the housing 206 of the customer-facing unit 226. Contactless card signals (such as contactless payment card signals) and other data are received at the antenna from the contactless payment card 212 by the same path.

In other embodiments, the antenna for the reader is part of the customer-facing unit 226 (and/or the housing 206) and is inductively coupled to the communications/processing components of the base unit 204.

In some embodiments, the housing 206 may also contain one or more indicators 240 which may be used to signal a status of the reader 200 to a user. For example, the indicators may be or include a number of light emitting diodes or other lighting devices which signal to the user that their contactless device has been read, or that the reader 200 is ready or in a state of readiness for a contactless device to be read. The indicators 240 may also be or include a speaker or other sound device which is operated to provide a audible signal to a user that a contactless card has successfully been read or that the reader 200 is ready to read data from a card.

Pursuant to some embodiments, operation of the reader 200 may cause a contactless operating volume 224 or region to be created in which a contactless device may be passed and read. The size of the contactless operating volume 224 may be sized to ensure that cards are not inadvertently read, and that users interacting with the reader are able to easily ensure that their cards are read when desired.

Figure 3:
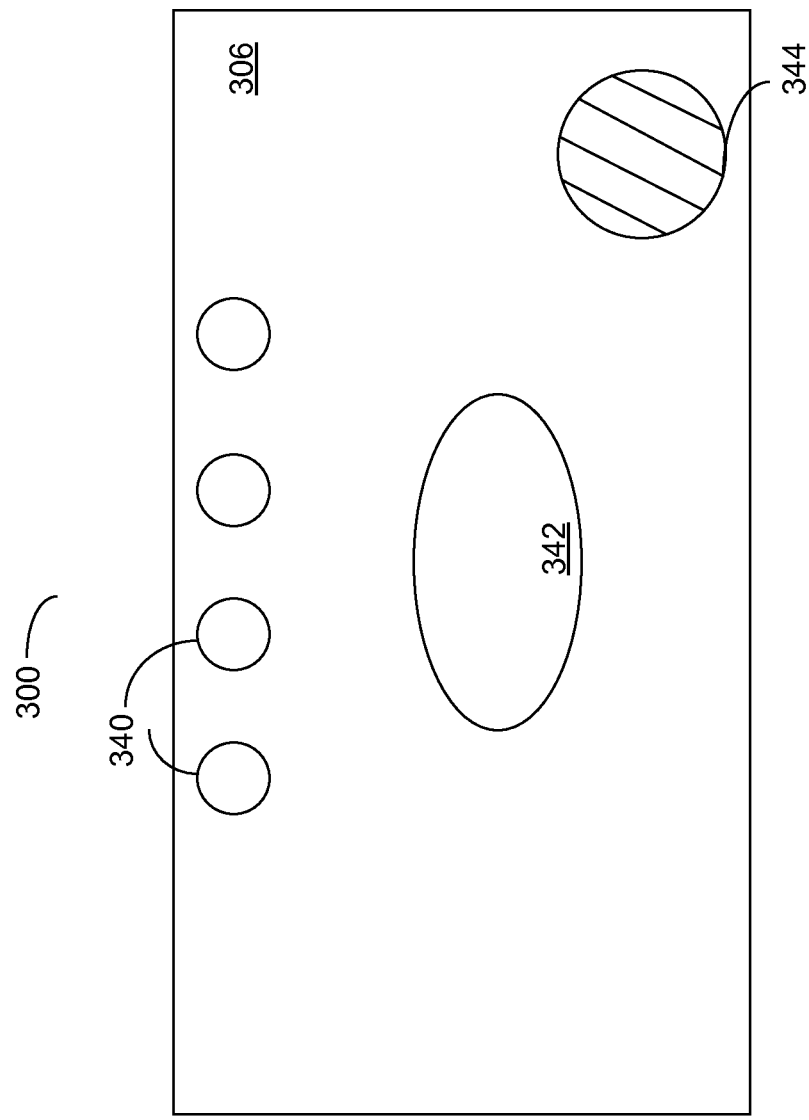
FIG. 3 is a schematic plan view of a customer-facing unit that is part of the contactless card reader of FIGS. 1 and 2.

Referring to FIG. 3, in some embodiments, the customer-facing unit 306 includes an indicia 342 (e.g., a standard logo or acceptance mark associated with contactless readers) for indicating a location at which a contactless card is to be presented to be read by the contactless card reader 100 (e.g., where the indicia 342 is positioned within the contactless operating volume or region described above). In some embodiments, the indicia 342 may be illuminated or associated with LEDs or other illuminated elements to aid in drawing the user's attention to the indicia. It will be appreciated that the indicia 342 may indicate the locus of the antenna as referred to above, whether the antenna is part of the customer-facing unit 306 or the base unit 104. The customer-facing unit 306 may also include one or more LEDs 340 that are selectively illuminated to indicate one or more activities of the contactless card reader 100. A sounder 344 or speaker may also be part of the customer-facing unit 306 to provide an audible tone to indicate that the contactless card reader 100 has successfully read a contactless card 112 presented at the reader. There also may be included in the customer-facing unit 306 one or more devices to complete the above-mentioned radio or optical communication link with the base unit 104.

In some embodiments, both the customer-facing unit 106 and the base unit 104 may each include a powerful magnet and may be held in place on opposite sides of the checkout counter wall by magnetic attraction between the two magnets.

The two part reader disclosed herein and particularly the low profile customer-facing unit 106 may be particularly suitable for installation on a bar, or the like, to facilitate reading of a contactless payment card incorporated in a drinking vessel, as disclosed in U.S. Published Patent Application No. 2010/0187298 (which has a common inventor herewith). In some embodiments, the customer-facing unit 106 could be considered to be a disposable item, subject to being replaced in case of excessive wear or soiling and/or to change graphic information (e.g., pricing information) presented on the top surface of the customer-facing unit 106.

As used herein and in the appended claims, the term "contactless card" should be understood to include contactless devices, including contactless payment devices (e.g., payment-enabled mobile telephones, payment fobs) that are not card-shaped.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A user-facing component of a contactless card reader, the user-facing component comprising:
    a housing for being secured to a first surface of an object at a point of sale location; and
    at least one indicia on the housing for indicating, to a user of a contactless card, a location at which said contactless card is to be presented to the contactless card reader;
    wherein no electrically conductive connection emerges from the housing so that the user-facing component is installable in unprotected locations.

2. The user-facing component of claim 1, further comprising an antenna contained within the housing,
    wherein the at least one indicia is for indicating a locus of the antenna.

3. The user-facing component of claim 2, wherein the antenna is optically or inductively coupled to a base unit of the contactless card reader.

4. The user-facing component of claim 1, wherein the at least one indicia is for indicating a locus of an antenna that is not contained within the housing.

5. The user-facing component of claim 4, wherein the antenna is part of a base unit of the contactless card reader, the base unit separate from the user-facing component.

6. The user-facing component of claim 1, wherein the housing is waterproof.

7. The user-facing component of claim 6, wherein the housing is formed of rubber or vinyl or is coated with a plastic film.

8. The user-facing component of claim 1, wherein no wire or cable emerges from the housing.

9. The user-facing component of claim 1, further comprising at least one display light, mounted on the housing, for being selectively illuminated to indicate activity by the contactless card reader.

10. The user-facing component of claim 1, further comprising a speaker mounted on the housing.

11. The user-facing component of claim 1, wherein the housing has a width in the range of 2 mm to 5 mm.

12. A contactless device reader comprising:
    a fixed object at a point of sale location, said object having a first surface and a second surface apart from the first surface;
    a user-facing unit installed on the first surface of the fixed object; and
    a base unit installed on the second surface of the fixed object so that the base unit is protected by the fixed object;
    wherein the first surface and the second surface are separated by a substantially solid material with no aperture located in the material between the user-facing unit and the base unit;
    the base unit for reading data from a contactless device;
    the user-facing unit including an indicia for indicating a location at which the contactless device is to be presented to the contactless card reader.

13. The contactless device reader of claim 12, wherein the user-facing unit contains a magnet for holding the user-facing unit in place via magnetic attraction between the magnet and a portion of the base unit.

14. The contactless device reader of claim 12, wherein the base unit reads payment card account data from the contactless device.

15. The contactless device reader of claim 12, wherein the base unit includes an antenna, and the indicia indicates a locus of the antenna.

16. The contactless device reader of claim 12, wherein the user-facing unit includes an antenna, and the indicia indicates a locus of the antenna.

17. The contactless device reader of claim 16, wherein the antenna is optically or inductively coupled to the base unit.

18. A method comprising:
    installing a user-facing unit of a contactless device reader on a first surface of an object at a point of sale location; and
    installing a base unit of the contactless device reader on a second surface of the object so that the base unit is protected by the object, said first surface and said second surface separated by a substantially solid material with no aperture present in the material between the user-facing unit and the base unit;
    the base unit including electronic components for generating interrogation signals for interrogating a contactless device, said electronic components also for receiving data signals from said contactless device, said data signals indicative of data stored in said contactless device; and said user-facing unit including at least one indicia for indicating, to a user of said contactless device, a location at which said contactless device is to be presented to said contactless device reader.

19. The method of claim 18, wherein no wire connection is formed between the user-facing unit and the base unit.

20. The method of claim 18, wherein said user-facing unit has a width in the range of 2 mm to 5 mm.

\* \* \* \* \*